United States Patent
Wang et al.

(10) Patent No.: US 8,827,163 B2
(45) Date of Patent: Sep. 9, 2014

(54) ANTI-FAKE IDENTIFICATION SYSTEM AND METHOD CAPABLE OF AUTOMATICALLY CONNECTING TO WEB ADDRESS

(75) Inventors: Shing-Jin Wang, Taoyuan County (TW); Ming-Town Lee, Taoyuan County (TW); Tain-Wen Suen, Taoyuan County (TW); Wen-Chieh Tsai, Taoyuan County (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 1809 days.

(21) Appl. No.: 11/949,950

(22) Filed: Dec. 4, 2007

(65) Prior Publication Data

US 2009/0140040 A1 Jun. 4, 2009

(51) Int. Cl.
| | |
|---|---|
| G06K 19/00 | (2006.01) |
| G06F 19/00 | (2011.01) |
| G06Q 30/00 | (2012.01) |
| G06Q 90/00 | (2006.01) |
| G06K 19/06 | (2006.01) |
| G06F 17/00 | (2006.01) |
| G06Q 20/00 | (2012.01) |
| H04L 9/32 | (2006.01) |
| G08B 13/14 | (2006.01) |
| G05B 19/00 | (2006.01) |
| G06Q 30/06 | (2012.01) |

(52) U.S. Cl.
CPC ...................................... *G06Q 30/06* (2013.01)
USPC ........... 235/487; 235/385; 235/492; 235/493; 235/375; 705/67; 713/161; 713/170; 340/572.1; 340/5.6; 340/5.8; 340/5.9

(58) Field of Classification Search
USPC ............ 235/487, 492, 493, 375, 385; 705/67; 340/572.1, 5.6, 5.8, 5.9; 713/161, 170
See application file for complete search history.

(56) References Cited

U.S. PATENT DOCUMENTS

| | | | |
|---|---|---|---|
| 7,841,513 B1 * | 11/2010 | Katzer et al. .................. | 235/375 |
| 8,256,688 B2 * | 9/2012 | Bourrieres et al. ........... | 235/494 |
| 8,317,098 B2 * | 11/2012 | Roth et al. ..................... | 235/385 |
| 2001/0054082 A1 * | 12/2001 | Rudolph et al. ............... | 709/217 |
| 2002/0178360 A1 * | 11/2002 | Wenocur et al. .............. | 713/170 |
| 2003/0085797 A1 * | 5/2003 | Li .................................. | 340/5.8 |
| 2005/0044180 A1 * | 2/2005 | Lamers et al. ................ | 709/218 |
| 2005/0072842 A1 * | 4/2005 | Yamagiwa .................... | 235/375 |
| 2005/0108044 A1 * | 5/2005 | Koster ............................... | 705/2 |

(Continued)

*Primary Examiner* — Daniel Walsh
(74) *Attorney, Agent, or Firm* — Rosenberg, Klein & Lee

(57) ABSTRACT

This invention relates to an anti-fake identification system and method capable of automatically connecting to web address, in which an electronic tag of commodity is scanned by a reader device so as to read the identification code into the computer device; the identification code includes a web address of a remote maker to which the computer can automatically connect so as to transmit the identification code to the web address; a verifying device receives and verifies the identification code at the web address, and produce an authentication code according to the identification code after the identification code passes through verification so as to confirm the accuracy of the identification code. The method comprises the following steps of: reading an identification code of commodity; transmitting the identification code to the web address; verifying the identification code and generating an authentication code when the identification code is accurate. When the identification code is verified to be accurate according to the authentication code, the computer can keep consumer informed that the commodity passing through anti-fake verification is genuine, and that the user's manual and service information of the commodity can be understood.

16 Claims, 8 Drawing Sheets

(56) References Cited

U.S. PATENT DOCUMENTS

| | | | |
|---|---|---|---|
| 2005/0139664 A1* | 6/2005 | Yamagiwa | 235/385 |
| 2005/0251431 A1* | 11/2005 | Schmidtberg | 705/6 |
| 2005/0289061 A1* | 12/2005 | Kulakowski et al. | 705/50 |
| 2007/0022294 A1* | 1/2007 | Lapstun et al. | 713/176 |
| 2007/0023513 A1* | 2/2007 | Andreasson et al. | 235/385 |
| 2007/0106897 A1* | 5/2007 | Kulakowski | 713/171 |
| 2007/0136360 A1* | 6/2007 | Randall et al. | 707/102 |
| 2007/0136584 A1* | 6/2007 | Diorio et al. | 713/168 |
| 2008/0106372 A1* | 5/2008 | Chang | 340/5.8 |
| 2008/0250483 A1* | 10/2008 | Lee | 726/7 |
| 2008/0301307 A1* | 12/2008 | Son et al. | 709/228 |
| 2009/0073965 A1* | 3/2009 | Dowling et al. | 370/352 |
| 2009/0115573 A1* | 5/2009 | Naressi et al. | 340/10.1 |
| 2009/0315670 A1* | 12/2009 | Naressi et al. | 340/5.8 |
| 2010/0106645 A1* | 4/2010 | Peckover | 705/50 |
| 2010/0134287 A1* | 6/2010 | Lettieri | 340/572.1 |
| 2010/0148934 A1* | 6/2010 | Nasser | 340/10.4 |
| 2010/0268654 A1* | 10/2010 | Dillon | 705/318 |
| 2010/0282837 A1* | 11/2010 | Yoo et al. | 235/375 |
| 2011/0025458 A1* | 2/2011 | Rokhsaz et al. | 340/5.8 |
| 2013/0020390 A1* | 1/2013 | Chen | 235/385 |
| 2013/0097085 A1* | 4/2013 | Peckover | 705/50 |
| 2013/0320079 A1* | 12/2013 | Nordin et al. | 235/375 |

* cited by examiner

ANTI-FAKE IDENTIFICATION SYSTEM AND METHOD CAPABLE OF AUTOMATICALLY CONNECTING TO WEB ADDRESS

BACKGROUND OF THE INVENTION

1. Field of the Invention

This invention relates to an identification system and method, particularly to an anti-fake identification system and method capable of automatically connecting to web address.

2. Brief Description of the Prior Art

As there are numerous well-known authentic goods in the market, some unconscientious companies imitate fake goods from well-known trademarked goods and sell them in the market so as to gain huge profits. Usually, inasmuch as fake goods are attached with same commodity tag as authentic goods, consumers would fail to recognize the difference between authentic goods and fake goods and thus frequently buy fake goods. In order to prevent consumer from purchasing fake goods, some anti-fake proposals of visual identification are developed, such as steel seal, logo mark, strip seal, engraving or hiding stripe or badge etc., such that consumer can differentiate between authentic goods and fake goods by visual identification. However, unconscientious companies have also developed anti-fake designs which are almost good enough as to look alike the genuine articles accompanying with the progress of imitation skill, so that consumers are deceived by the imitated anti-fake article due to the innocence on anti-fake design. Although the improvement on anti-fake designs of visual identification never stops its pace, anti-fake technologies depending solely on visual identification are, however, yet insufficient to prevent consumers from buying fake goods. Therefore, anti-fake technologies other than the development of anti-fake tag of visual identification are successively proposed, such as optical anti-fake design including laser patterning, fluorescent light authentication stripe, UV tag, or tag with anti-fake processing package, so as to improve the inefficiency of the visual identification for anti-fake design.

However, the above anti-fake designs usually have few variation which are in lack of flexibility in diversified application. For example, same anti-fake design may happen in the goods of same category. In such case, when the anti-fake design in one of the goods is cracked, then the other of the goods of same category might be placed in jeopardy. Thus, a large quantity of fake commodities will flow massively into the market after the cracking of the anti-fake design, and consumers still have the possibility of using or buying fake goods.

In addition, commodity of high unit price sold by exclusive vendors to the customer can be checked on its genuineness and prices by the identification device provided in the vendor. However, consumer has no suitable tool to recognize the genuineness later, moreover, it is not easy to check the genuineness of goods after they are off shelf. After receiving the gift transferred a couple of times, people even cannot know exactly the genuineness and its origin of the gift. People are also upset that they cannot enquire the genuineness of goods at any time.

In view of the above problems, it is an eager anticipation to propose a science-and-technology-based anti-fake identification system and method for consumer, such that the defects of conventional anti-fake design are improved and anti-fake reliability of goods can be raised. Therefore, the inventor of this invention proposes a new anti-fake identification system and method capable of automatically connecting to web address according to research and improvement made with respect to the conventional existing structure after continuous devotion to the product development and design based on the experience and professional knowledge accumulated in the long term involvement of relevant field concerning anti-fake affairs. Accordingly, a satisfactory solution by this proposal can be expected.

SUMMARY OF THE INVENTION

The main object of the present invention is to provide an anti-fake identification system and method capable of automatically connecting to web address, which connects to the database located at the web address according to the identification code read from an electronic tag so as to conduct data matching and verifying. In this manner, the accuracy of the identification code can be determined so as to avoid wrong purchase of fake goods.

The secondary object of the present invention is provide an anti-fake identification system and method capable of automatically connecting to web address, in which commodity data can be obtained from the identification code or the authentication code corresponding to the identification code, so that consumer can fully understand the information concerned about the operation of commodity.

Still another object of the present invention is to provide an anti-fake identification system and method capable of automatically connecting to web address, in which the identification code further contains a password so as to prevent the verification of identification code from being cracked.

This invention provides an anti-fake identification system and method capable of automatically connecting to web address, comprising an electronic tag, a computer device and a verifying device, wherein the electronic tag contains an identification code having an web address and moreover commodity data; the computer device has a built-in reader device connecting to the web address, the reader device reads the identification code from the electronic tag into the computer device; the computer device can automatically connect to the corresponding web address according to the identification code so as to transmit the identification code to the web address. The verifying device is located at the web address. The verifying device receives and verifies the identification code, further can verifies a password simultaneously. After passing through verification, the verifying device produces an authentication code which is transmitted back to the computer device to confirm the genuineness of the goods. The method comprises the following steps of: reading an identification code of a commodity containing an web address; transmitting the identification code to the web address corresponding to the identification code; verifying the identification code and generating an authentication code corresponding to the identification code when the identification code passes through verification, and further verifying a password simultaneously so as to avoid being cracked; confirming the accuracy of the identification code according to the authentication code. In this manner, the present invention can provide people with the difference between the genuine commodity and the fake goods. Accordingly, the reliability of the anti-fake design can be improved effectively by the present invention such that the purchase of fake goods by consumer can be avoided. Furthermore, the present invention comprises a database server which conducts commodity data matching and gives authorization to read commodity data which contains commodity type and commodity information for providing consumer with fully understanding of commodity.

BRIEF DESCRIPTION OF THE ACCOMPANYING DRAWINGS

DETAILED DESCRIPTION OF THE PREFERRED EMBODIMENTS

The technical features and effectiveness of the present invention will become more apparent by the detailed description of the following preferred embodiments of the present invention in conjunction with the accompanying drawings.

Figure 1:
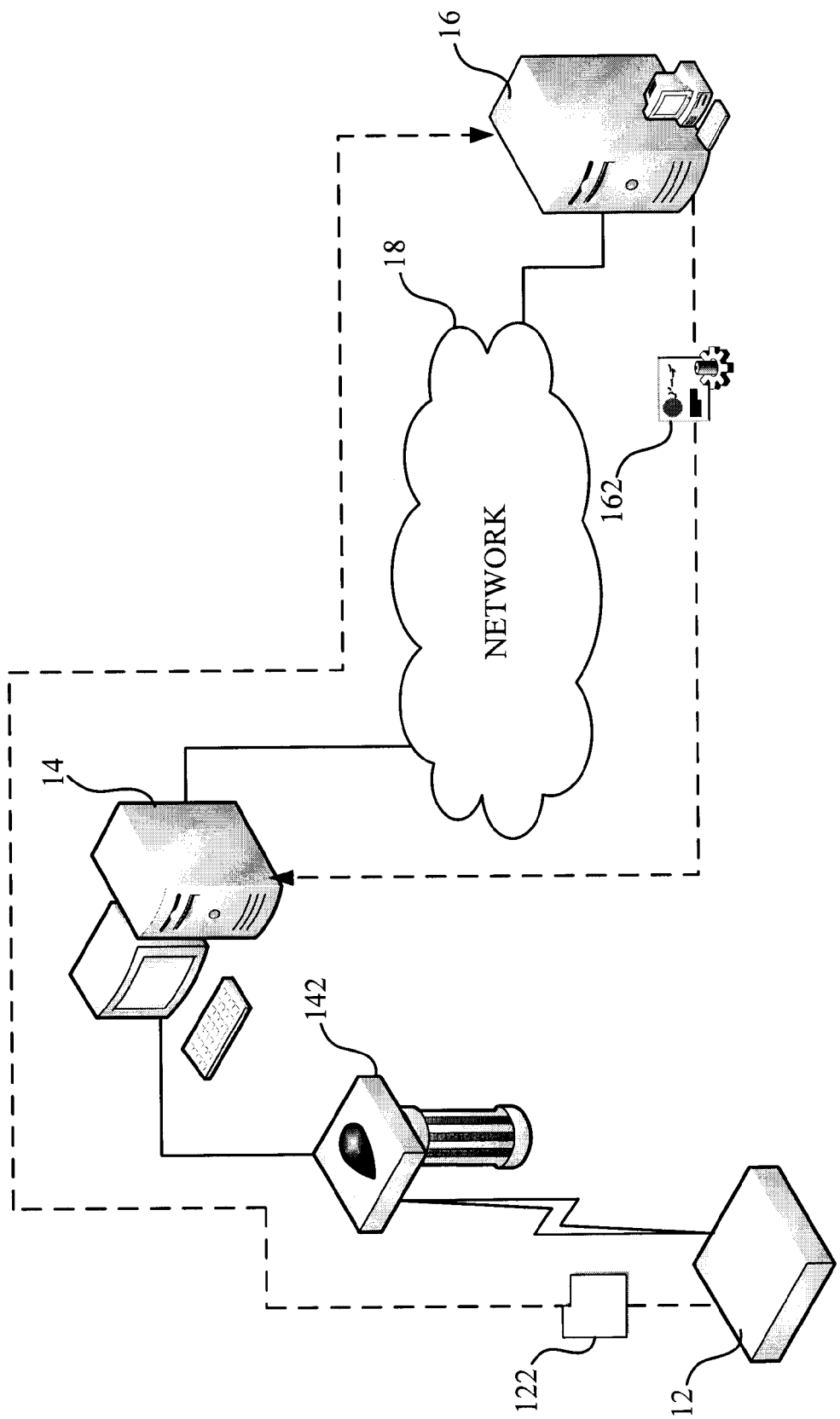
FIG. 1 is a block diagram of an embodiment of the anti-fake identification system of the present invention.

Firstly referring to FIG. 1, a block diagram of an embodiment of the anti-fake identification system of the present invention is shown. As shown in FIG. 1, an anti-fake identification system 10 capable of automatically connecting to web address of the present invention comprises an electronic tag 12, a computer device 14, a verifying device 16 and a network 18. The computer device 14 and the verifying device 16 are connected to the network 18 which can be an internet or a LAN. The electronic tag 12 includes an identification code 122 having a web address and, if necessary, commodity data. Preferably, the electronic tag 12 in this embodiment is a RFID chip and the web address can be a TCP/IP address or a HTTP address. The computer device 14 can be combined integrally with a RF reader device 142, the interface of which is coupled to the computer device 14 through a transmission port. The transmission port can be a RS-232 transmission port, an universal serial RS-422 transmission port or a RS-485 transmission port. The reader device 142 reads identification code 122 into the computer device 14 by scanning the commodity from the electronic tag 12. The computer device 14 transmits the identification code 122 to the web address according to the web address contained in the identification code 122, and the verifying device 16 corresponds to the web address. The computer device 14 comprises a display and control software which displays the verification result of the verifying device 16 and the word explanation of the commodity verification and the commodity drawings. In addition, consumer can control the computer device 14 by means of the display and control software. For example, consumer conducts the control by touch control input mode to select the necessary word explanation and the commodity drawings.

Therefore, the verifying device 16 receives the identification code 122 through the network 18 and conducts data matching as well as verifying procedures. When the identification code 122 passes through verification, the verifying device 16 generates an authentication code 162 which is then transmitted back to the computer device 14 through the network 18. In this manner, consumer can confirm the accuracy of the identification code 122 by the authentication code 162. In other words, the computer device 14 can keep consumer informed that the commodity attached with the electronic tag 12 is a authentic goods. In addition, the reader device 142 of the present invention can be a RF reader, and the electronic tag 12 of the present invention can be a RF ID chip. The web address contained in the identification code 122 is the web address of maker which is the web address corresponds to the verifying device 16, and which can be a TCP/IP address or a HTTP address.

Figure 2:
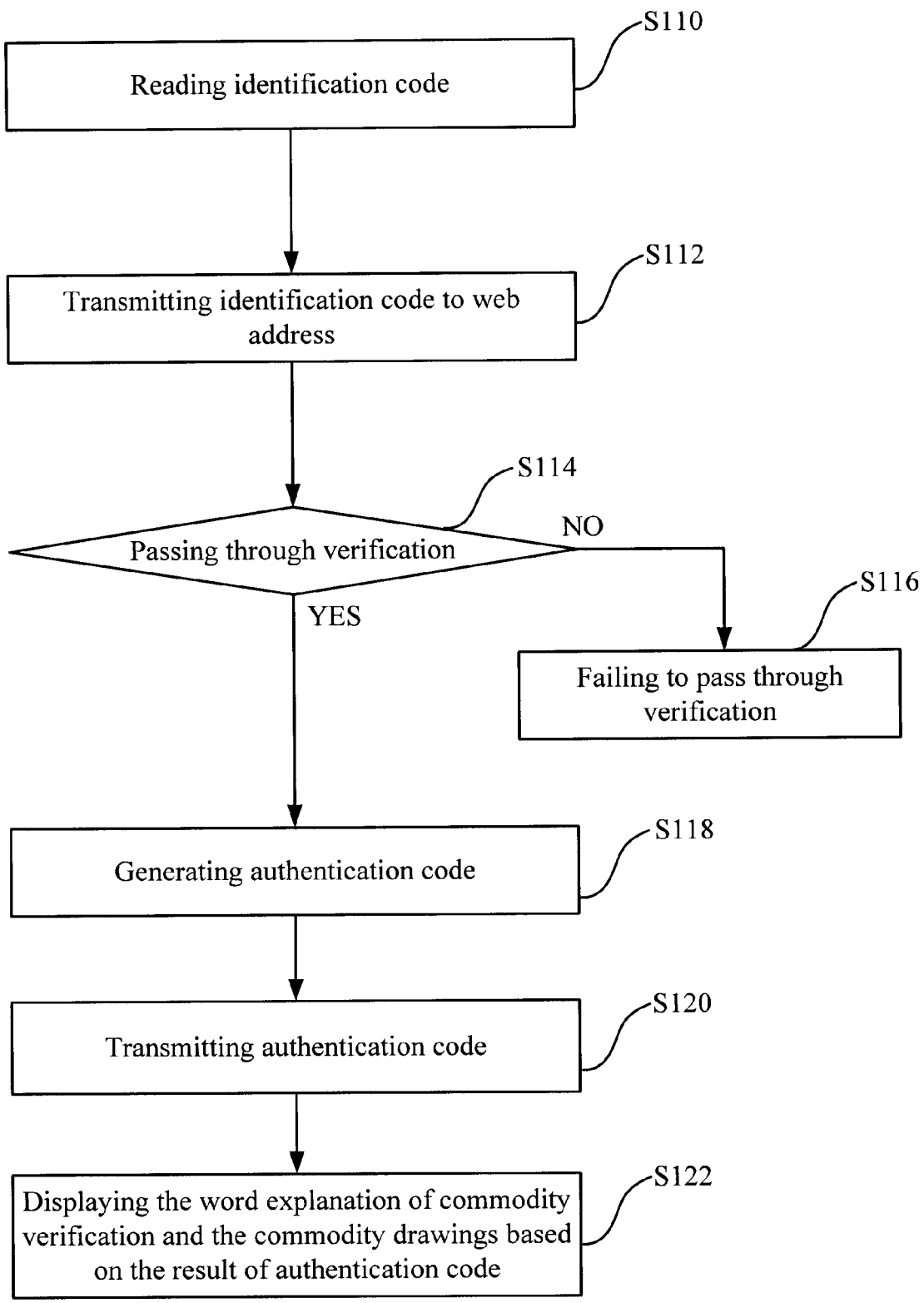
FIG. 2 is a flow chart of an embodiment of the anti-fake identification method of the present invention.

Referring to FIG. 2, a flow chart of an embodiment of the anti-fake identification method of the present invention is shown. The anti-fake identification method capable of automatically connecting to web address of the present invention will be described as follow. In step S110, the reader device 142 read the identification code 122 from the electronic tag 12 into the computer device 14. Next, in step S112, the computer device 14 transmits the identification code 122 to the location and commodity data of maker's web address contained in the identification code 122. In step S114, the identification code 122 is verified. When the identification code 122 is failed to pass through verification, process moves to step S116. When the identification code 122 passes through verification, process moves to step S118. In step S116, the verifying device 16 transmits the information of verification failure to the computer device 14 which automatically displays the alert information of fake goods. In step S118, the verifying device 16 generates an authentication code 162 with respect to the identification code 122. In step S120, the verifying device 16 transmits the authentication code 162 back to the computer device 14. In step S122, the computer device 14 displays the word explanation of commodity verification and the commodity drawings based on the result of the authentication code 162. In other words, the computer device 14 keeps consumer informed that the commodity attached with the electronic tag 12 is an authentic goods. In addition, the computer device 14 can cooperate with a system identification operation software to conduct the verifying process according to the above steps so as to finish the commodity verification.

Figure 3:
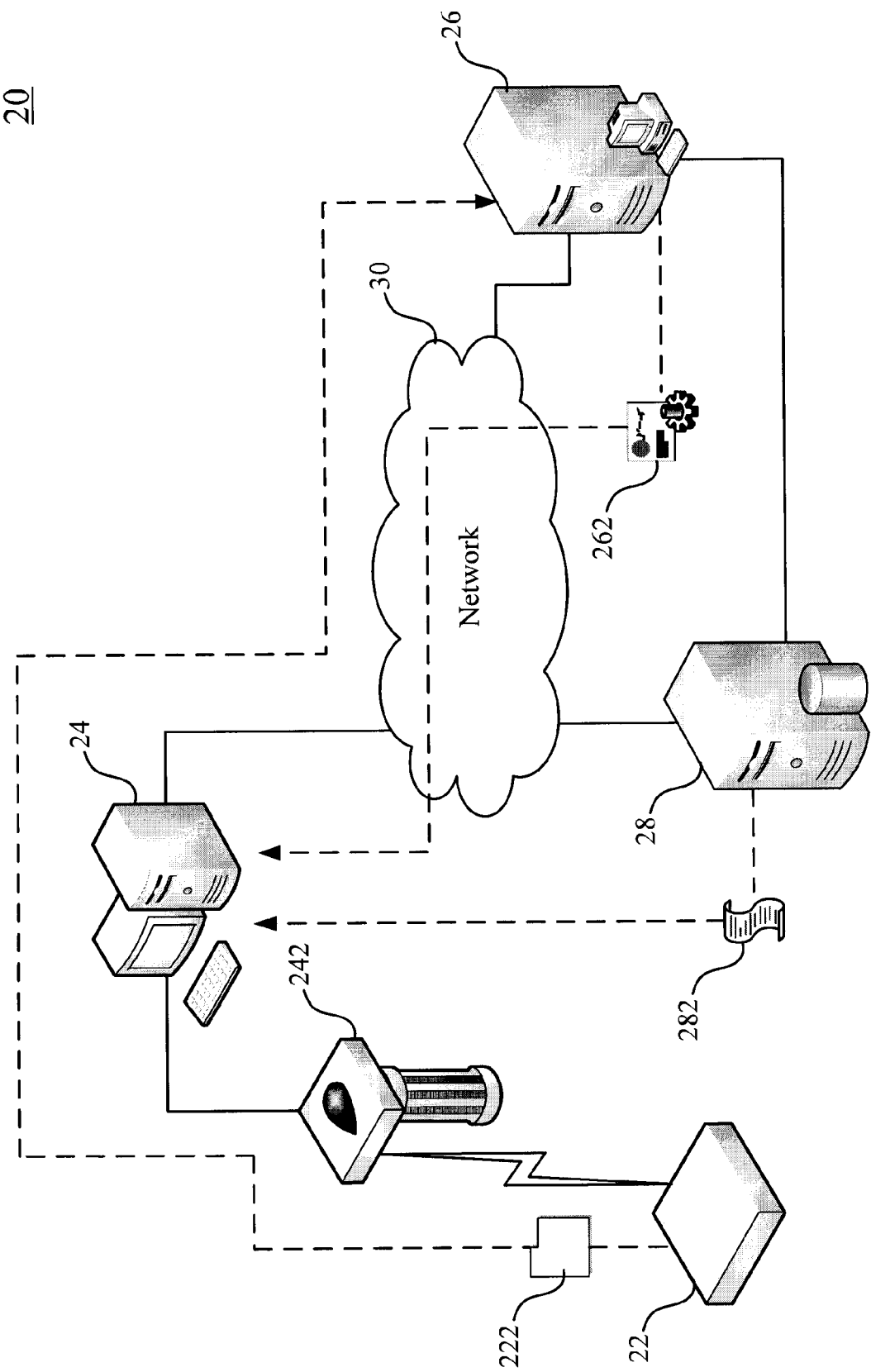
FIG. 3 is a block diagram of another embodiment of the anti-fake identification system of the present invention.

In FIG. 3, a block diagram of another embodiment of the anti-fake identification system of the present invention is shown. The difference between FIG. 1 and FIG. 3 is that the anti-fake identification system 20 in FIG. 3 further includes a database server 28 connected to the verifying device 26 and the network 30. In addition to verify the identification code 222 by means of the verifying device 26, the anti-fake identification system 20 of the present invention further give authorization to obtain commodity data 282 from the database server 28 by the authentication code 262 corresponding to the identification code 222. The computer device 24 gets the identification code 222 of the electronic tag 22 of the commodity by the reader device 242, and transmits the identification code 222 to the web address contained in the identification code 222. The computer device 24 comprises a display and control software which displays the verifying result of the verifying device 26 and the word explanation of the commodity identification and the drawings of commodity. In addition, consumer can control the computer device 24 by means of the display and control software. For example, consumer conducts the control by touch control input mode to select the necessary word explanation and the commodity drawings. The reader device 242 of the present invention can be a RF reader, and the electronic tag 22 of the present invention can be a RFID chip. The web address contained in the identification code 222 is the maker's web address which is the web address corresponding to the verifying device 26, and which can be a TCP/IP address or a HTTP address. Inasmuch as the verifying device 26 corresponds to the web address, the computer device 24 transmits the identification code 222 to the verifying device 26. When the verifying device 26 verifies the identification code 222 and the identification code 222 passes through verification, the verifying device 26 generates an authentication code 262. Then, the database server 28 conducts commodity data matching according to the identification code 222 or the authentication code 262, and gives authorization to read the commodity data 282 from the database. Further, the verifying device 26 transmits the commodity data 282 back to the computer device 24 through the network 30. In this manner, the present invention not only can provides consumer with identification of a authentic goods or a fake goods, but also can provide corresponding identification code 222 and the commodity data verification result, so as to get full commodity information such as user's manual, commodity contents and service life. Therefore, consumer can use the anti-fake identification system of the present invention at home so as to concretely understand the origin of the commodity and its genuineness. User's manual can be easily available by the present invention, when consumer gets a commodity without having user's manual.

Figure 4:
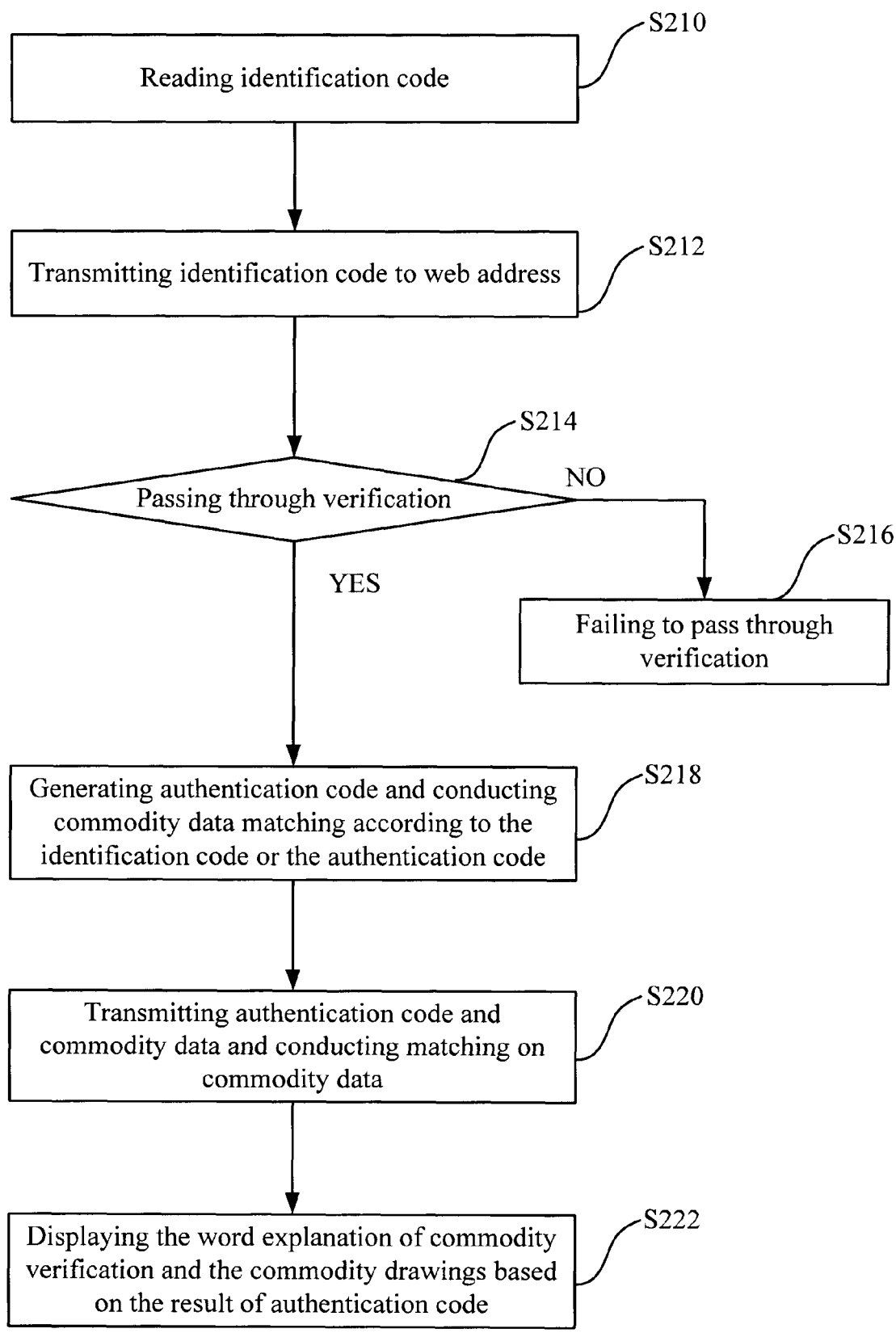
FIG. 4 is a flow chart of another embodiment of the anti-fake identification method of the present invention.

In FIG. 4, a flow chart of another embodiment of the anti-fake identification method of the present invention is shown. The difference between FIG. 2 and FIG. 4 is that the flow chart of FIG. 4 further comprises a step of reading the commodity data 282 according to the identification code 262. The anti-fake identification method of the present invention will be described as follow. In step S210, the reader device 242 read out the identification code 222 from the electronic tag 22 into the computer device 24. Next, in step S212, the computer device 24 transmits the identification code 222 to the verifying device 26 corresponding to the web address. In step S214, the identification code 222 is verified by the verifying device 26. When the identification code 222 is failed to pass through verification, the verifying device 26 executes the step S216. When the identification code 222 passes through verification, the verifying device 26 executes the step S218. In step S216, the verifying device 26 transmits an error code to the computer device 24 so that consumer understands the electronic tag 22 is fake through the display on the computer device 24. In step S218, the verifying device 26 generates an authentication code 262 with respect to the identification code 222. Then, the database server 28 conducts commodity data matching according to the identification code 222 or the authentication code 262, and gives authorization to read the commodity data 282 from the database.

Finally in step S220, the database server 28 conducts matching on commodity data 282 and transmits the verified result to the computer device 24 through the network 30. In step S222, the computer device 24 confirms the identification code 222 is correct according to the authentication code 262 and displays the verified result information. In this manner, the present invention not only confirms the electronic tag 22 being an authentic goods by verifying the identification code 222, but also can get the commodity data 282 corresponding to the identification code 222 or the authentication code 262, which includes the commodity type and explanation of commodity concerned information. In addition, the computer device 24 can cooperate with a system identification operation software to conduct the verifying process according to the above steps so as to finish the commodity verification.

Figure 5:
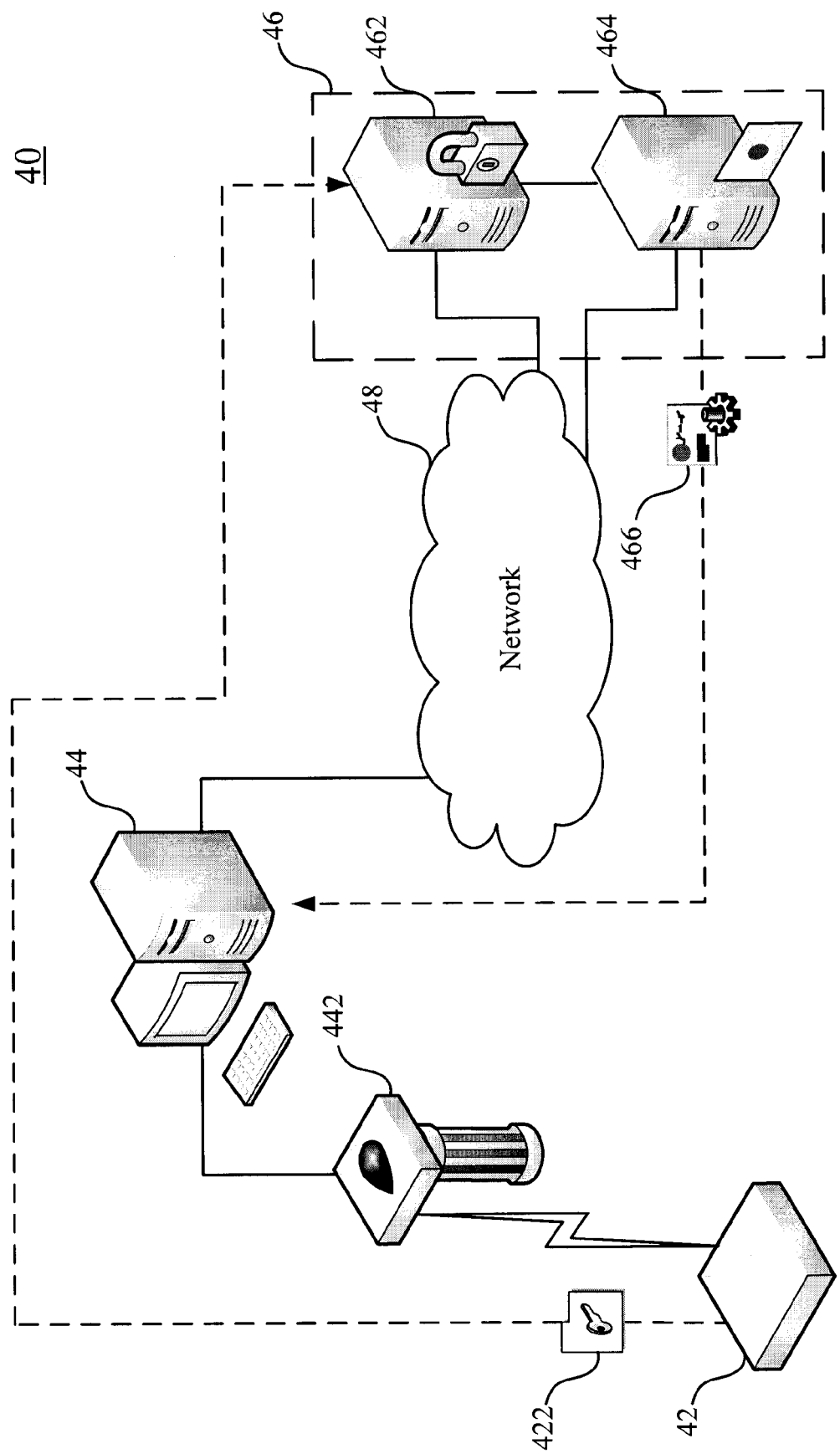
FIG. 5 is a block diagram of still another embodiment of the anti-fake identification system of the present invention.

In FIG. 5, a block diagram of still another embodiment of the anti-fake identification system of the present invention is shown. The difference between FIG. 1 and FIG. 5 is that the identification code 422 further comprises a password, and the verifying device 46 of the anti-fake identification system 40 includes a password verifying unit 462 and an identification analysis unit 464. The password verifying unit 462 is connected with the identification analysis unit 464 and the network 48, while the identification analysis unit 464 is connected with the network 48. In addition to verify the identification code 422 by the verifying device 46, the anti-fake identification system 40 of the present invention can further verifies a password contained in the identification code 422 so as to prevent the identification code 422 from being cracked. The computer device 44 transmits the identification code 422 obtained by the reader device 442 from the electronic tag 42 to the computer device 44. The computer device 44 comprises a display and control software which displays the verified result of the verifying device 46 and the word explanation of the commodity verification and the commodity drawings. In addition, consumer can control the computer device 44 by means of the display and control software. For example, consumer conducts the control by touch control input mode to select the word explanation in need and the drawings of commodity. The identification code 422 of the electronic tag 42 comprises not only the web address and the commodity data but also a password. The web address is maker's web address which can be applied as a TCP/IP address or a HTTP address.

The password verifying unit 462 of the verifying device 46 is provided with a password lock with which the password verifying unit 462 can verify the matching of the password of the identification code 422. When the password of the identification code 422 passes through verification, i.e., the password matches with the password lock, the identification analysis unit 464 is connected so as to conduct the matching analysis of the identification code 422 for commodity verification. When the password is failed to match with the password lock, the password verifying unit 462 transmits an error code to the computer device 44 to show that the identification code 422 is stolen or modified. When the identification code 422 passes through verification, the identification analysis unit 464 generates an authentication code 466 which is then transmitted back to the computer device 44 through the network 48. The computer device 44 displays the result of the commodity verification, i.e., that the commodity attached with the electronic tag 42 is an authentic goods.

Figure 6:
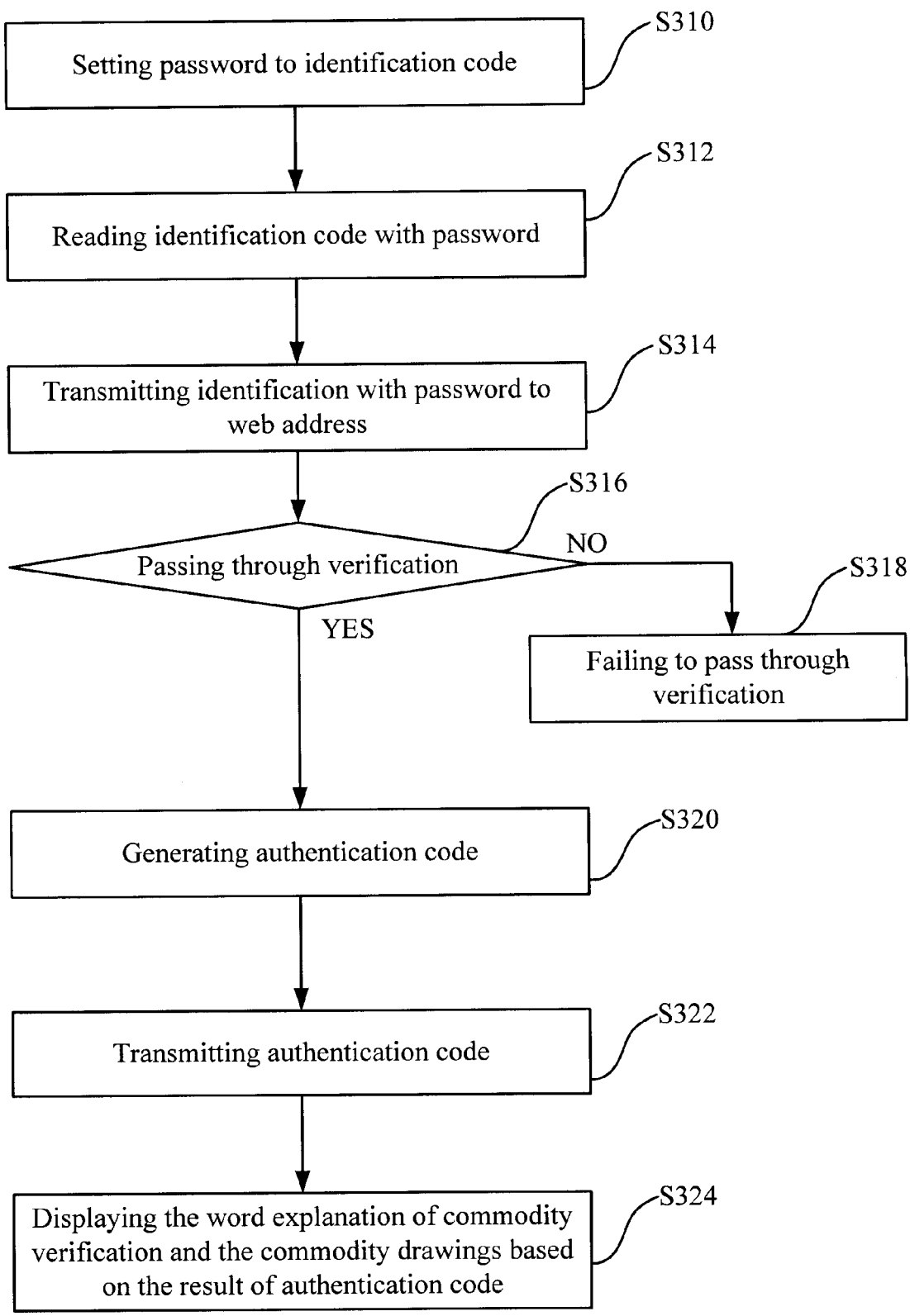
FIG. 6 is a flow chart of still another embodiment of the anti-fake identification method of the present invention.

In FIG. 6, a flow chart of still another embodiment of the anti-fake identification method of the present invention is shown. The difference between FIG. 2 and FIG. 6 is that the flow chart in FIG. 6 further contains a step S310 of setting a password to the identification code 422 before the step S312 of reading the identification code, and a step S316 of verifying the password. In step S310, the password is firstly set in the identification code so as to prevent of identification code from being cracked. In step S312, the reader device 442 reads out the identification code 422, which contains password and web address, of the electronic tag 42 of commodity into the computer device 44. In step S314, the computer device 44 transmits the identification code 422 containing password to the verifying device 46 corresponding to the web address contained in the identification code 422. In step S316, the verifying device 46 verifies the password of the identification code 422 whether the password matches with the corresponding password lock. When the password fails to pass through verification, i.e., the password does not match with the corresponding password lock, the verifying device 46 executes step S318 in which an error code is transmitted to the computer device 44 so as to confirm the identification code 422 is stolen. When the password passes through verification, i.e., the password matches with the corresponding password lock, the verifying device 46 executes step S320 in which the identification code 422 is verified by the identification analysis unit 464 so as to generate an authentication code 466 with respect to the identification code 422, and step S322 is carried out simultaneously. In step S322, the verifying device 46 transmits the authentication code 466 to the computer device 44 to carry out step S324 in which the commodity attached with the electronic tag 42 is an authentic goods is confirmed. In addition, the computer device 44 can cooperate with a system identification operation software to conduct the verifying process so as to finish the commodity verification.

Figure 7:
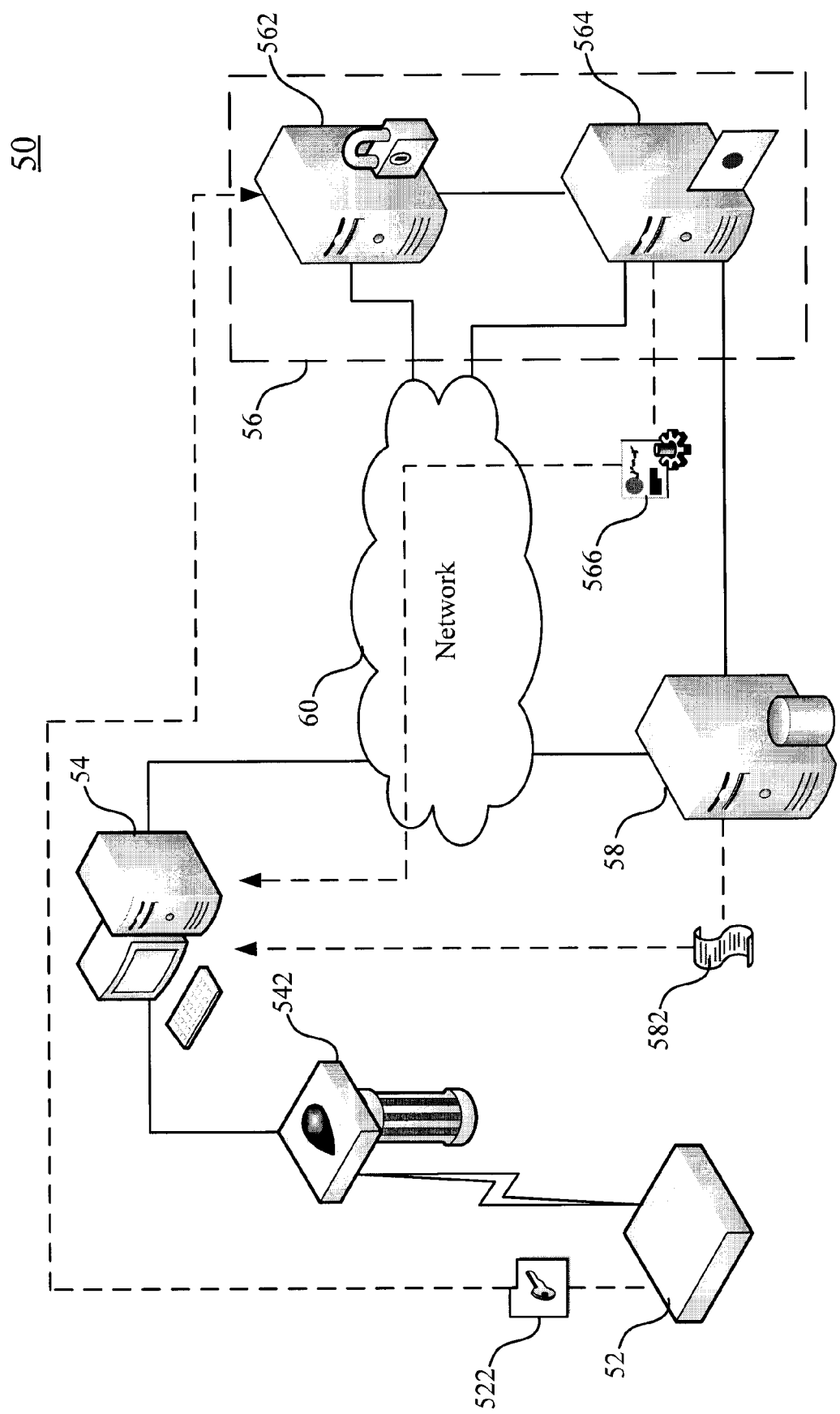
FIG. 7 is a block diagram of yet another embodiment of the anti-fake identification system of the present invention.

In FIG. 7, a block diagram of yet another embodiment of the anti-fake identification system of the present invention is shown. The difference between FIG. 5 and FIG. 7 is that the anti-fake identification system 50 further includes a database server 58. After the identification code 522 passes through the secret verification, the database server 58 conducts commodity data matching according to the identification code 522 or the authentication code 566 corresponding to the identification code 522, and gives authorization to read the commodity data 582 containing commodity type and commodity specification, by which consumer can apprehend the whole commodity information through the commodity data matching and verifying procedures. The verifying device 56 of the present invention includes a password verifying unit 562 and an identification analysis unit 564. The password verifying unit 562 conducts verification according to the identification code 522, which is read out from the commodity electronic tag 52 by the reader device 542 of the computer device 54. When the password of the identification code 522 passes through verification, the identification analysis unit 564 generates an authentication code 566 according to the identification code 522, and the authentication code 566 is then transmitted back to the computer device 54 through the network 60. The computer device 54 comprises a display and control software which displays the verifying result of the verifying device, the word explanation of the commodity verification and the commodity drawings. In addition, consumer can control the computer device 54 by means of the display and control software, such as touch control input. The database server 58 conducts data matching of goods according to the identification code 522 or the authentication code 566, and gives authorization to read a commodity data 582 which is then transmitted to the computer device 54 through the network 60. In this way, consumer can understand the explanation of full result of anti-fake verification of goods.

Figure 8:
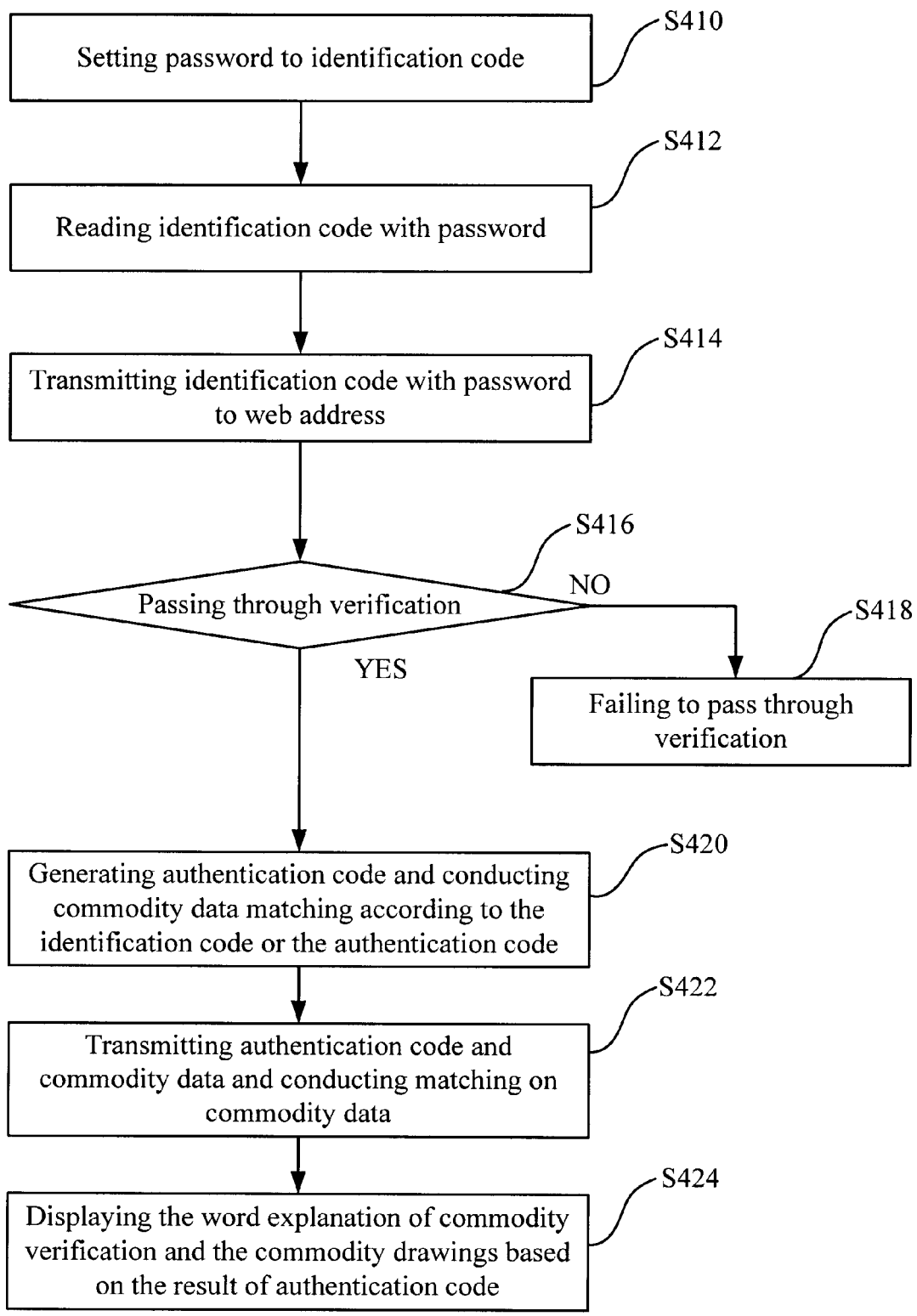
FIG. 8 is a flow chart of still yet another embodiment of the anti-fake identification method of the present invention.

In FIG. 8, a flow chart of still yet another embodiment of the anti-fake identification method of the present invention is shown. The difference between FIG. 6 and FIG. 8 is that the flow chart of FIG. 8 further comprises a step S422 in which the commodity data matching is conducted, according to the identification code 522 or the authentication code 566, and an authorization is given to read commodity data 582 after a step S420 of generating the authentication code 566. The anti-fake identification method of the present invention will be described as follow. In step S410, a password is firstly set in the identification code 522; in step S412, the identification code 522 which contains password and web address corresponding to the verifying device 56 is read by the reader device 542; In step S414, the identification code 522 is transmitted to the verifying device 56 according to the web address contained in the identification code 522; in step S416, the password of the identification code 522 is verified. If the password fails to pass through verification, the step S418 is executed. If the password passes through verification, the step S420 is executed. As shown in step S418, the verifying device 56 generates an error code which is transmitted to the computer device 54 through the network 60 to confirm that the identification code 422 is stolen or the commodity with the electronic tag 52 is fake.

As shown in step S420, the identification analysis unit 564 generates an authentication code 566 according to the identification code 522, and the database server 58 conducts commodity data matching and gives authorization to read the commodity data 582 from database; in step S422, the verifying device 56 transmits the authentication code 566 to the computer device 54, and the database server 58 transmits the commodity data 582 to the computer device 54; finally, as shown in step S424, the computer device 54 confirms according to the authentication code 566 that the commodity attached with the electronic tag 52 is a authentic goods, and also displays the data of anti-fake verification result so as to provide full explanation of commodity for consumer. In addition, the computer device 54 can cooperate with a system identification operation software to conduct the verifying process so as to finish the commodity verification.

Based on foregoing, this invention relates to an anti-fake identification system and method capable of automatically connecting to web address, which provides double identification service mode including verification and authorization, and which takes advantage of the identification code which contains a web address of maker's website and commodity data of the electronic tag, the web address being a maker's website which corresponds to a verifying device. After the computer device reads out the identification code by a read device, if the computer device automatically connects to the verifying device according to the web address and the identification code passes through verification, the verifying device confirms that the electronic tag is correct, i.e., the commodity attached with the electronic tag is a authentic goods. When the computer fails to read or fails to verify, the computer device confirms that the electronic tag is fake, i.e., the commodity attached with the electronic tag is a fake goods. In this manner, the reliability of anti-fake identification can be raised, and the identification of fake goods and authentic goods can be effectively provided for consumer. Furthermore, the present invention comprises database server which reads commodity data from database according to the identification code or the authentication code so as to provide full explanation of operation for the consumer. Also, the present invention includes a password so as to prevent the identification code from being cracked.

Summing up above, the present invention can reach expected effectiveness, and the specific configurations disclosed herein have yet not seen in the prior art of the same category of product, even has not been opened to the public before application. Thus, this invention has novelty, inventive step and availability in industry such that the present invention is in conformity with the requirement for a patent.

Additional advantages and modifications will readily occur to those skilled in the art. Therefore, this invention in its broader aspects is not limited to the specific details and representative embodiment shown and described herein. Accordingly, various modifications and variations may be made without departing from the spirit and scope of the general inventive concept as defined by the appended claims and their equivalents.

What is claimed is:

1. An anti-fake identification system automatically connecting to a web address, comprising:
    an electronic tag attached to a commodity, said tag comprising an RFID chip having an identification code and a password stored in the RFID chip, said identification code comprising at least a first and second set of data, said first set of data indexing said website address and said second set of data comprising commodity data;

a computer device provided with a reader device, the reader device reading said identification code and said password from the electronic tag of the commodity into said computing device, said computer device automatically connecting to said web address and transmitting said second set of data and said password to said web address;

a verifying device corresponding to said web address and operably connected to said computer device over a network, said verifying device receiving and verifying said second set of data and said password from said computer device, said verifying device generating an authentication code upon said second set of data and said password passing through said verification, said verification device transmitting said authentication code to said computer device through said network, said second set of data and said password are only transmitted to the verifying device for verification, and said authentication code being received at said computer device identifies that said commodity is authentic;

and a database server connected with said verifying device and computer device over said network, and upon said verification and said generation of said authentication code, said database server receives said authentication code and in response to receipt of said authentication code, said database server matches the authentication code to additional commodity data of the database server, said additional commodity data comprising a user manual corresponding to the commodity and service information of the commodity, and the database server providing said additional commodity data to the computer device and wherein the computer device displays said commodity data and said additional commodity data of the authentic commodity.

2. An anti-fake identification system capable of automatically connecting to web address as claimed in claim 1, wherein said commodity data contains a commodity type and a commodity explanation data.

3. An anti-fake identification system capable of automatically connecting to web address as claimed in claim 1, wherein said computer device is further provided with a transmission port coupling to said RF read device.

4. An anti-fake identification system capable of automatically connecting to web address as claimed in claim 3, wherein said transmission port is a RS-232 transmission port or a universal serial RS-422 transmission port or a RS-485 transmission port.

5. An anti-fake identification system capable of automatically connecting to web address as claimed in claim 1, wherein said computer device and said reader device are designed to be integral with each other.

6. An anti-fake identification system capable of automatically connecting to web address as claimed in claim 1, wherein said web address is a TCP/IP address or a HTTP address.

7. An anti-fake identification system capable of automatically connecting to web address as claimed in claim 1, wherein said electronic tag is a RF chip.

8. An anti-fake identification system capable of automatically connecting to web address as claimed in claim 1, wherein said reader device is a RF reader.

9. An anti-fake identification system capable of automatically connecting to web address as claimed in claim 1, wherein said computer device further comprises a display and control software for referring the identification code index to the web address, said commodity data of commodity, for reading and connecting the web address, commodity data in accordance with the identification code, for transmitting said identification code and said password to the web address and for processing the received authentication code and displaying the verification result of said verifying device, the word explanation of commodity verification and commodity drawings.

10. An anti-fake identification system capable of automatically connecting to web address as claimed in claim 1, wherein said computer device further includes a system identifying operation software.

11. An anti-fake identification method automatically connecting to a web address, comprising the steps of:

electronically reading an identification code and a password stored in an RFID chip attached to a commodity by a computer device provider with a reader device, said identification code comprising at least a first and second set of data, the first set of data indexing said website address and said second set of data comprising commodity data;

electronically transmitting said second set of data and said password to said web address via the computer device over a network;

at a verifying device corresponding to said web address and connected to said network, verifying said second set of data and said password;

at said verifying device, generating an authentication code in response to said verification of said second set of data and said password;

transmitting the authentication code over the network from the verifying device to the computer device, and the computer device, upon receiving said authentication code confirms said commodity is authentic, and wherein said second set of data and said password are only transmitted to the verifying device for verification;

a database server connected with said verifying device and computer device over said network, and upon said verification and said generation of said authentication code, said database server receives said authentication code and in response to receipt of said authentication code, said database server matches the authentication code to additional commodity data of the database server, said additional commodity data comprising a user manual corresponding to the commodity and service information of the commodity, and the database server providing said additional commodity data to the computer device;

displaying, via the computer device, said commodity data and said additional commodity data of the authentic commodity.

12. An anti-fake identification method capable of automatically connecting to web address as claimed in claim 11, wherein said commodity data contains commodity type and commodity explanation data.

13. An anti-fake identification method capable of automatically connecting to web address as claimed in claim 11, wherein said identification code and said password in the step of verifying said identification code and said password are conducted with data matching according to an identification data and an associated password data in a database for verification, and generates said authentication code when said identification code and said password both match with said identification data and said associated password data in said database.

14. An anti-fake identification method capable of automatically connecting to web address as claimed in claim 11, wherein said identification code further indexes to commodity data.

15. An anti-fake identification method capable of automatically connecting to web address as claimed in claim 14, wherein said web address is a TCP/IP address or a HTTP address.

16. An anti-take identification system automatically connecting to a web address, comprising:
   an electronic tag, comprising an RFID chip, attached to a commodity, said electronic tag containing an identification code and a password, said identification code comprising at least a first set of data and a second set of data, said first set of data indexing said web address and said second set of data comprising commodity data;
   a computer device provided with a reader device, said reader device scans the electronic tag of said commodity and reads said identification code and said password into said computer device, said computer device automatically transmits said second set of data and said password to said website;
   a verifying device corresponding to said web address and operably connected to said computer device over a network, said verifying device receiving and verifying said second set of data and said password from said computer device, said verifying device generating an authentication code upon said second set of data and said password passing through said verification, said verification device transmitting said authentication code to said computer device through said network, said second set of data and said password are only transmitted to the verifying device for verification, and said authentication code being received at said computer device identifies that said commodity is authentic; wherein the verifying device comprises:
   a password verifying unit for verifying said password of said identification code, which generates an error code and transmits said error code to said computer device upon said password failing to pass through verification, and an identification analysis unit which verifies said second set of data upon verification of said password;
   and a database server connected with said verifying device and computer device over said network, and upon said verification and said generation of said authentication code, said database server receives said authentication code and in response to receipt of said authentication code, said database server matches the authentication code to additional commodity data of the database server, said additional commodity data comprising a user manual corresponding to the commodity and service information of the commodity, and the database server providing said additional commodity data to the computer device and wherein the computer device displays said commodity data and said additional commodity data of the authentic commodity.

* * * * *